Dec. 31, 1963 P. GEYER Re. 25,505

THRUST BEARING

Original Filed March 12, 1959 3 Sheets-Sheet 1

INVENTOR.
PAUL GEYER

BY
Robert J. Patterson
ATTORNEY.

THRUST BEARING

Original Filed March 12, 1959 3 Sheets-Sheet 2

INVENTOR.
PAUL GEYER
BY
Robert J. Patterson
ATTORNEY.

THRUST BEARING

Original Filed March 12, 1959 3 Sheets-Sheet 3

INVENTOR.
PAUL GEYER
BY
Robert J. Patterson
ATTORNEY.

United States Patent Office

Re. 25,505

Reissued Dec. 31, 1963

25,505

THRUST BEARING

Paul Geyer, Detroit, Mich., assignor to United States Rubber Company, New York, N.Y., a corporation of New Jersey Original No. 2,970,868, dated Feb. 7, 1961, Ser. No. 798,911, Mar. 12, 1959. Application for reissue Feb. 6, 1963, Ser. No. 258,104

7 Claims. (Cl. 308—3)

Figure 1:
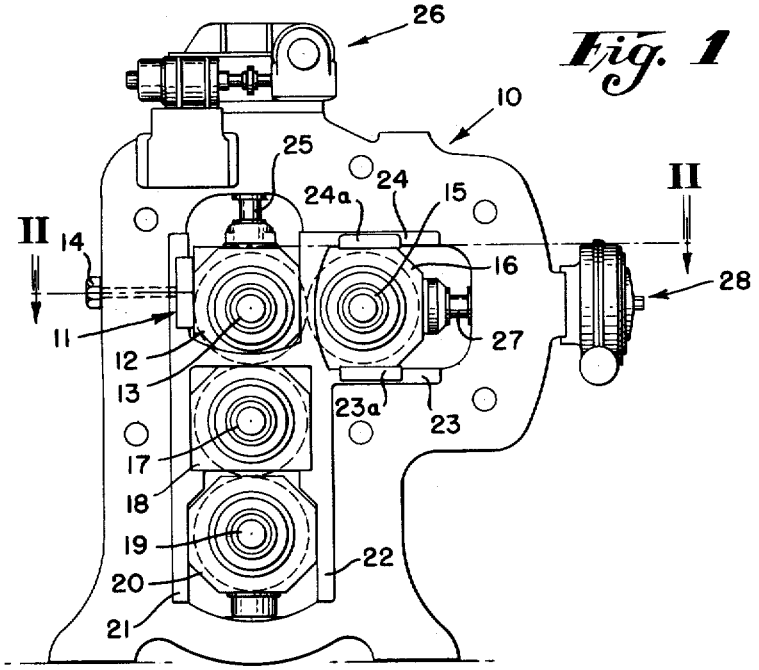

Matter enclosed in heavy brackets [ ] appears in the original patent but forms no part of this reissue specification; matter printed in italics indicates the additions made by reissue.

This invention relates to a thrust bearing and, in particular, to a thrust bearing which will permit small, relatively friction-free adjustments in a direction at right angles to the direction of the thrust.

The bearing of the invention may be used to advantage in a variety of applications where small adjustments under heavy loads are required. Typical of the applications for which the bearing may be used are calender roll mountings, machinery mountings, and bridge end mountings.

The bearing of the invention is particularly useful in a four roll calender of the type having an off-set roll. In such a calender, rubber stock is fed between the off-set roll and the top roll to form a continuous sheet of rubber. This sheet of rubber is continuously fed with a continuous sheet of fabric between the top and middle rolls to calender the rubber onto the fabric. Adjustments in the nip or space between the top and middle rolls to accommodate finished fabric gauge splices in the fabric and other irregularities are commonly made by vertically moving the top roll. As the horizontal thrust on the top roll by reason of the rubber passing between the top roll and the off-set roll is extremely high, the frictional force, particularly the initial or break-away force, resisting vertical movement of the bearings of the top roll in their slides is also extremely high so that binding of the bearings of the top roll occurs and vertical adjustment of the top roll is extremely difficult. The use of roller bearings to decrease this friction has been unsuccessful, because the rollers under the extremely high thrust load form pits in the polished steel thrust plates of the slides which results in increasing the coefficient of friction.

One object of the present invention is to provide a thrust bearing which will withstand the high horizontal thrust exerted on the top roll with very little deflection while allowing relatively easy vertical adjustment of the top roll. To accomplish this object, the thrust bearing of the present invention utilizes a layer of confined rubber which is substantially incompressible but which, on the other hand, is capable of deformation in the shear direction. The thrust load is resisted by the hydrostatic pressure induced in the rubber which is mounted in such a manner that deflection must produce a volumetric change in the rubber, while movement in the vertical direction or shear load is resisted only by the elastic deformation of the rubber in shear, while constant volume of the confined rubber is maintained. In accordance with the invention, a layer of the rubber is interposed and confined between a plate and channel, fitted with suitable rocker plates so that the top and bottom of the bearing are moveable relative to each other in a parallel direction. The thrust bearing so constructed is placed behind each of the journal bearings of the top roll of the calender. The horizontal thrust on the top roll is resisted by the confined, substantially incompressible rubber between the plate and channel, while adjustment of the top roll in the vertical direction may be readily made by deformation of the rubber in shear. Thus the high initial frictional force occurring in sliding bearings, commonly referred to as the break-away force, is not involved in the use of the thrust bearing of the instant invention and the difficulty in adjustment and the wear inherent in the use of sliding or roller bearings is eliminated.

The bearing also provides a self-aligning feature. Calender rolls deflect in service and have to be crowned in order to produce a flat sheet of rubber. The roll necks, which of necessity are smaller, add to this deflection. The effect of this deflection on a calender bearing is to increase bearing pressure on the load side and decrease it on the far side. The rubber portion of the bearing of the present invention acts similar to water under hydrostatic pressure and equalizes the load. The rubber is redistributed about the centerline of the bearing, thus effecting self-alignment while maintaining the original thickness at the centerline.

Figure 5:
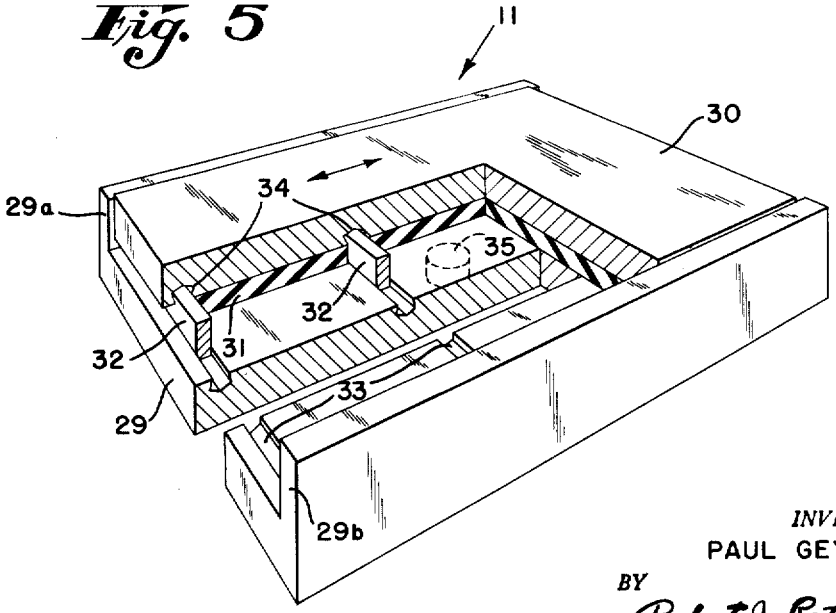
Figure 2:
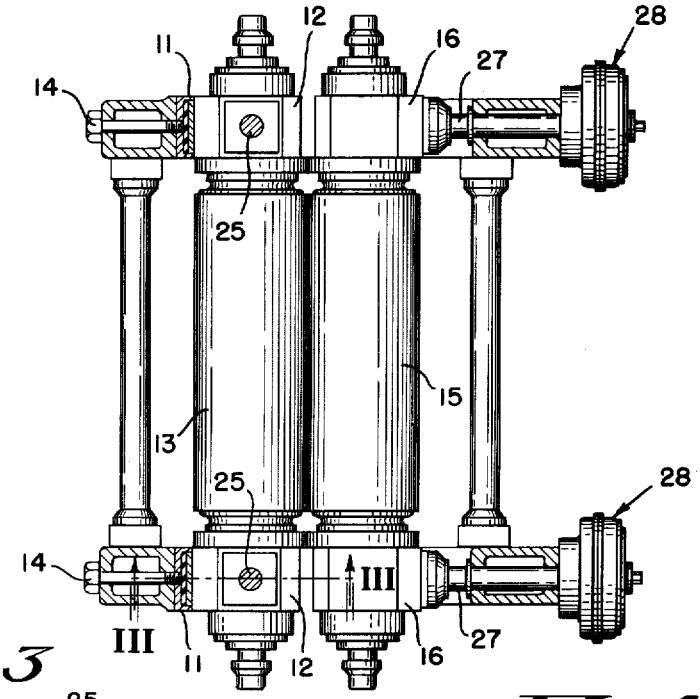
Figure 3:
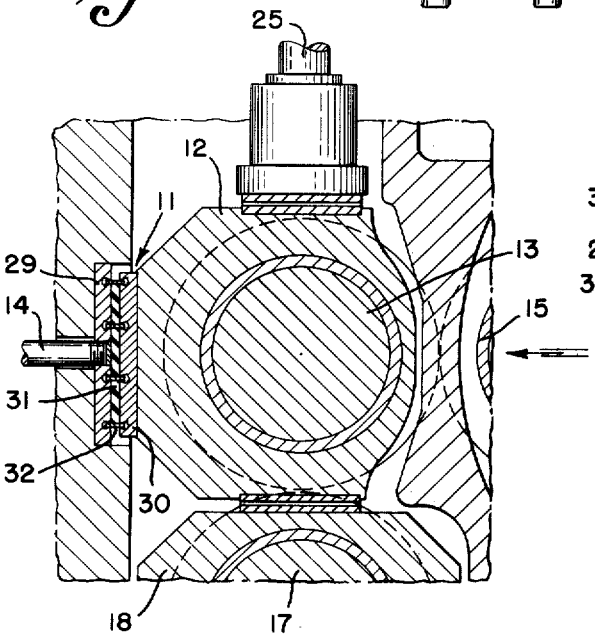
Figure 4:
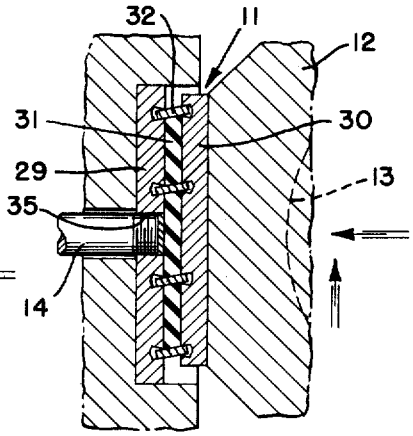
Figure 6:
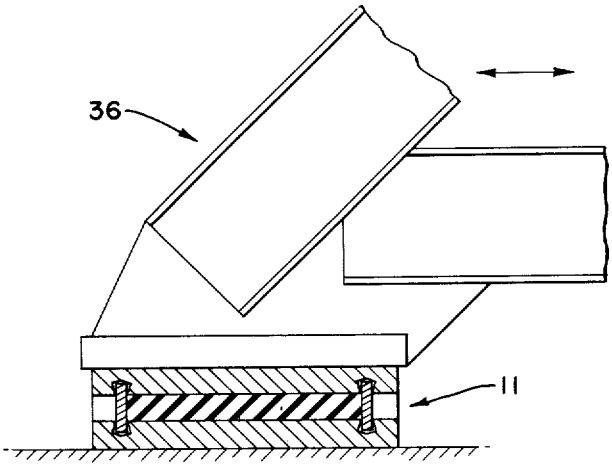
Figure 7:
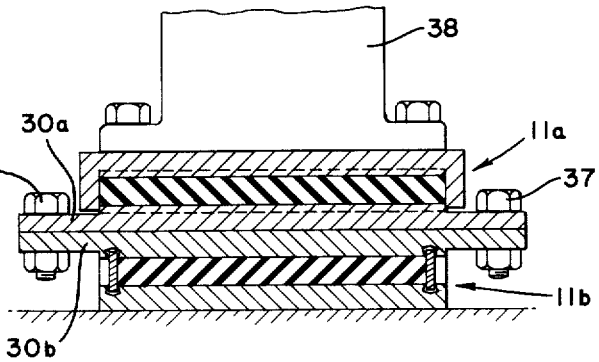
Figure 8:
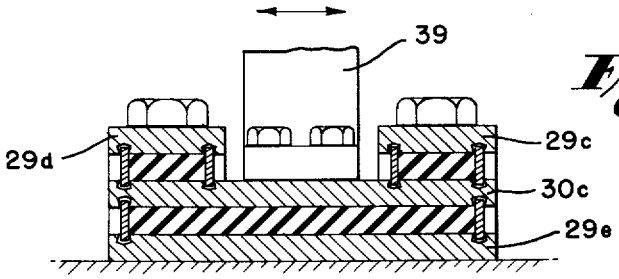

Other objects and advantages of the present invention will become apparent from the following description when read in conjunction with the accompanying drawings wherein:

FIG. 1 is an elevational view of a four roll calender incorporating thrust bearings in accordance with the present invention, FIG. 2 is a sectional view taken on the line II—II of FIG. 1, FIG. 3 is an enlarged sectional view taken on the line III—III of FIG. 2, FIG. 4 is a partial sectional view showing the movement of the parts of the thrust bearing under vertical adjustment of the top roll of the calender, FIG. 5 is a perspective view of the thrust bearing with parts broken away to show the details of the bearing, FIG. 6 is an elevational view, partly in section, showing the free end of a bridge resting on the bearing of the invention to allow horizontal expansion of the bridge, FIG. 7 is a sectional view of a modified form of the bearing of the invention which provides for expansion or adjustment in two directions, and FIG. 8 is a sectional view of still another modified form of the bearing of the invention.

Referring to the drawings, and in particular to FIG. 1, there is shown a conventional four roll calender, generally designated by the reference number 10, incorporating thrust bearings 11 constructed in accordance with the present invention.

As best shown in FIG. 2, two thrust bearings 11 are provided, one behind each of the two journal bearings 12 of the top roll 13. The thrust bearings 11 replace the conventional wear plates commonly provided in such calenders and are held in place by bolts 14 which extend through the frame of the calender and thread into the thrust bearings 11.

The four roll calender is otherwise of conventional construction and includes an off-set roll 15 which is journaled at its ends in journal bearings 16, a middle roll 17 which is journaled at its ends in journal bearings 18 and a bottom roll 19 which is journaled at its ends in journal bearings 20.

The journal bearings of the top and bottom rolls are slidably mounted in suitable ways 21 and 22. The journal of off-set roll 15 is slidably mounted in ways 23 and 24. Ways 23 and 24 may be provided with wear plates 23a and 24a.

Top roll 13 is adapted to be adjusted vertically to vary the nip or space between it and middle roll 17 by adjusting screws 25 which are connected to the journal bearings 12. The screws 25 are adapted to be actuated by conventional actuating mechanisms 26 mounted on the top of the frame of the calender. Off-set roll 15 is adapted to be adjusted horizontally to vary the nip or space between it and top roll 13 by screws 27 which in turn are rotated or actuated by mechanisms 28.

As is well known to those skilled in the art, the fabric to be coated is passed between top roll 13 and the middle roll 17. Rubber to coat the top of the fabric is sheeted out by passing rubber from the top through top roll 13 and off-set roll 15 and rubber to coat the bottom side of the fabric is sheeted out between roll 17 and bottom roll 19. It will be appreciated that adjustments in the nip or space between the top roll 13 and the middle roll 17 by vertical adjustments of the top roll 13 are necessary for finished fabric gauge and to allow splices in the fabric or other irregularities to pass between the rolls and that these vertical adjustments of the top roll 13 must be made while the journal bearings 12 are subjected to the extremely high thrust load imposed thereon by the rubber passing between off-set roll 15 and top roll 13. The thrust bearing of the invention accepts this thrust while allowing vertical adjustment of the top roll 13 without encountering the high initial frictional resistance or break-away load which is encountered in the use of sliding or roller bearings.

Referring to FIG. 5, the thrust bearing 11 includes a channel 29 and plate 30 having a layer of rubber 31 interposed therebetween. The rubber layer 31 is confined between the channel 29 and plate 30 on one side by flanges 29a and 29b of the channel 29 and in the other direction by plate members 32 which can rock in grooves provided in channel 29 and plate 30 to permit relative parallel movement between the channel 29 and plate 30 and shear deformation of the layer or pads of rubber 31 in the direction of the arrows in FIG. 5. The rocker connection between the plate members 32 and the parallel channel 29 and plate 30 is conveniently provided by forming dovetail slots 33 and 34 in the opposed faces of the channel 29 and plate 30 respectively into which the edges of the plates 32 extend. This permits the plate 32 to rock or cock when the channel 29 and plate 30 are moved relative to each other, and still not mechanically connect channel 29 and plate 30. This rocking movement can be readily seen by comparison of FIGS. 3 and 4.

The grooves 33 and 34 are preferably made sufficiently deep to allow for some compression of the rubber layer 31. While rubber is substantially incompressible, it can be compressed to a very slight extent under very high loads. The plate 30 is also made of sufficient thickness to extend above the outer surfaces of the flanges 29a and 29b so that the flanges do not take any of the compression load.

As previously described, the thrust bearing 11 is provided in place of conventional wear plates behind each of the journal bearings 12 of the top roll 13 and are held in place by bolts 14 which thread into opening 35 in the plate 29.

The rubber layer or pads 31 are made of relatively soft rubber so that they will deform readily in shear.

Good results have been obtained using a neoprene rubber having a hardness of 60, measured on a Shore Durometer (Scale A). It will be appreciated, of course, that various types of rubber having various hardnesses may be used depending on the load conditions. The primary consideration is that the rubber flows readily under a shear load but is still stiff or hard enough that it will not leak out of the seams of the joint of the bearing. A flexible bag filled with liquid can be used in some applications.

The pads 31 are preferably bonded to the plates 29 and 30 to form an integrated unit which may be easily handled.

Referring to FIG. 6 the thrust bearing 11 of the invention is shown used as an end support for a bridge 36. The bearing takes the place of the usual roller support. It will be apparent that the bearing will accept the high vertical thrust imposed by the bridge while allowing for thermal expansion of the bridge in the direction of the arrow in FIG. 6.

Referring to FIG. 7 there is shown a slightly modified form of bearing in which two bearings 11a and 11b, similar to bearing 11 previously described, are disposed at right angles to each other to permit adjustments in two directions perpendicular to one another. Plates 30a and 30b of bearings 11a and 11b are elongated and secured together by suitable bolts 37. The resulting bearing may be used as a machinery mounting or for other uses where adjustments in two directions are desired. The portion indicated by the reference numeral 38 represents one leg of a piece of machinery.

Referring to FIG. 8, there is shown another modification of the bearing of the invention used to support a leg of a piece of machinery. This bearing is also a multiple unit for allowing expansion of long equipment in one direction. In this modification top and bottom channels 29c, 29d and 29e are bolted together and the leg 39 of the machine bolted to a common plate 30c between channels 29c and 29d.

From the above description it can be seen that there is provided a novel thrust bearing which will accept extremely high thrust loads such as those imposed on the top roll of a four roll calender or by the end of a bridge or heavy machinery and which at the same time will permit small adjustments to be made relatively easily in a direction at right angles to the direction of thrust by shear deformation of the rubber layer or pads 31. While the term rubber has been used it will be appreciated that it has been used in its generic sense to include natural rubber, synthetic rubber and other rubber-like materials.

Having thus described my invention, what I claim and desire to protect by Letters Patent is:

1. A thrust bearing comprising, a pair of spaced plates, a layer of rubber interposed between said plates, means extending between said plates for confining said rubber against lateral flow by thrust loads applied perpendicularly to said plates while allowing parallel movement of said plates and shear deformation of said layer of rubber without changing volume by shear loads applied to the bearing.

2. A thrust bearing comprising, a pair of plates, a layer of rubber interposed between said plates, wall members extending between said plates for confining said rubber against a lateral flow by thrust loads applied perpendicularly to said plates, at least one set of opposing wall members having a rocking connection with said plates so as to allow relative parallel movement of said plates and shear deformation of said layer of rubber without changing volume by shear forces applied to said bearing.

3. A thrust bearing comprising, a pair of parallel substantially rectangular plates, a layer of rubber interposed between said plates, one of said plates having flanges on two sides thereof having sliding engagement with two opposed sides of the other plate to thereby confine said rubber against lateral flow in a direction perpendicular to said flanges by thrust loads applied to said plates in a perpendicular direction, plate members extending between said parallel plates and said flanges in a direction perpendicular to said flanges to thereby confine said rubber against lateral flow in a direction perpendicular thereto by thrust loads applied in a perpendicular direction to said parallel plates, said plate members being pivoted in recesses in said parallel plates to allow relative parallel movement of said parallel plates and shear deformation of said layer of rubber without changing volume by shear forces applied to said bearing in one direction.

4. A thrust bearing comprising, a pair of parallel substantially rectangular plates, a layer of rubber interposed between said plates, one of said plates having flanges on two sides thereof having sliding engagement with two opposed sides of the other plate to thereby confine said rubber against lateral flow in a direction perpendicular to said flanges by thrust loads applied to said plates in a perpendicular direction, plate members extending between said parallel plates and said flanges to thereby confine said rubber against lateral flow in a direction perpendicular thereto by thrust loads applied to said parallel plates in a perpendicular direction, said plate members extending into dovetailed grooves formed in the inner surfaces of said parallel plates whereby said members may rock to allow relative parallel movement of said parallel plates and shear deformation of said layer of rubber without changing volume when shear loads are applied to said bearing.

*5. A thrust bearing comprising: a pair of opposed rigid load-bearing members; a yieldable, substantially incompressible medium interposed between and separating said load-bearing members; wall members, extending between said load-bearing members, for confining said medium against flow from between said load-bearing members when said load-bearing members are subjected to thrust loads directed to force them together; said medium filling the space confined by said load-bearing members and said wall members; at least one opposed set of said wall members having rocking connections with said load-bearing members so as to permit relative movement of said load-bearing members in a direction normal to said thrust loads without change in volume of said medium confined therebetween.*

*6. A thrust bearing comprising: a pair of opposed rigid load-bearing members; a yieldable, substantially incompressible medium interposed between and separating said load-bearing members; wall members, extending between said load-bearing members, for confining said medium against flow from between said load-bearing members when said load-bearing members are subjected to thrust loads directed to force them together; said medium filling the space confined by said load-bearing members and said wall members; one opposed pair of said wall members*

*being parallel and pivotally mounted in recesses in said load-bearing members to permit relative movement of said load-bearing members in a direction normal to said pivotally mounted wall members without change in volume of said medium confined therebetween.*

*7. A thrust bearing comprising: a pair of opposed rigid load-bearing members; a yieldable, substantially incompressible medium interposed between and separating said load-bearing members; rigid lateral confining means, extending between said load-bearing members, for confining said medium against flow from between said load-bearing members when said load-bearing members are subjected to thrust loads directed to force them together; said medium filling the space confined by said load-bearing members and said lateral confining means; said lateral confining means permitting relative parallel movement of said load-bearing members normal to the direction of said thrust loads without change in volume of said medium interposed therebetween while simultaneously preventing any relative rotation of said load-bearing members.*

References Cited in the file of this patent or the original patent

UNITED STATES PATENTS

| | | |
|---|---|---|
| 1,169,206 | Sydney | Jan. 25, 1916 |
| 1,425,979 | Kingsbury | Aug. 15, 1922 |
| 1,968,199 | Greve | July 31, 1934 |
| 2,655,005 | Kinneman | Oct. 13, 1953 |
| 2,784,998 | Blackwood | Mar. 12, 1957 |
| 2,812,221 | Cupler | Nov. 5, 1957 |
| 2,846,210 | Carrier | Aug. 5, 1958 |
| 2,865,628 | Montagna | Dec. 23, 1958 |